United States Patent
Ringger

(10) Patent No.: US 6,520,567 B2
(45) Date of Patent: Feb. 18, 2003

(54) VEHICLE WINDOW VENTILATION SYSTEM

(75) Inventor: Kurt A. Ringger, Bluffton, IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/970,720

(22) Filed: Oct. 4, 2001

(65) Prior Publication Data
US 2002/0073626 A1 Jun. 20, 2002

Related U.S. Application Data
(60) Provisional application No. 60/238,324, filed on Oct. 5, 2000.

(51) Int. Cl.[7] .................................................. B60J 5/04
(52) U.S. Cl. ...................... 296/208; 296/146.2; 454/122
(58) Field of Search .............................. 296/208, 146.2; 454/95, 121, 122

(56) References Cited

PUBLICATIONS

1998 GMC Model T6500 (picture 4) 1998 GMC Model T6500 (picture 5), 3 holes inner view window.*

* cited by examiner

Primary Examiner—Dennis H. Pedder
(74) Attorney, Agent, or Firm—Jeffrey P. Calfa; Neil T. Powell; Dennis Kelly Sullivan

(57) ABSTRACT

A vehicle window ventilation system of this invention contains vertical slots in forward portions of the window or frame. Air due to vehicle movement passes in the slots to the cavity between the windowpanes. There is a passage for airflow from the cavity rearward to the door handle where there is spacing for outward passage of air. The forward location of the vertical slots allows for the flow of air across a wide area of the windows and hence a minimum reduction of visibility due to moisture in the cavity. The air passageway rearward through the cavity between the windows and then through the door to the rearward located door handle allows for a dispersion pattern of air that covers a large amount of the surface area of the double pane window. While an external fan could be used to enhance the removal of flow of air the forward location of the vertical slots and the rearward location of the inner door passageway to the door handle alleviates the necessity of having a fan. The vertical slots allow the direction of airflow over the windowpanes inner surfaces from the top to the bottom of the panes.

9 Claims, 5 Drawing Sheets

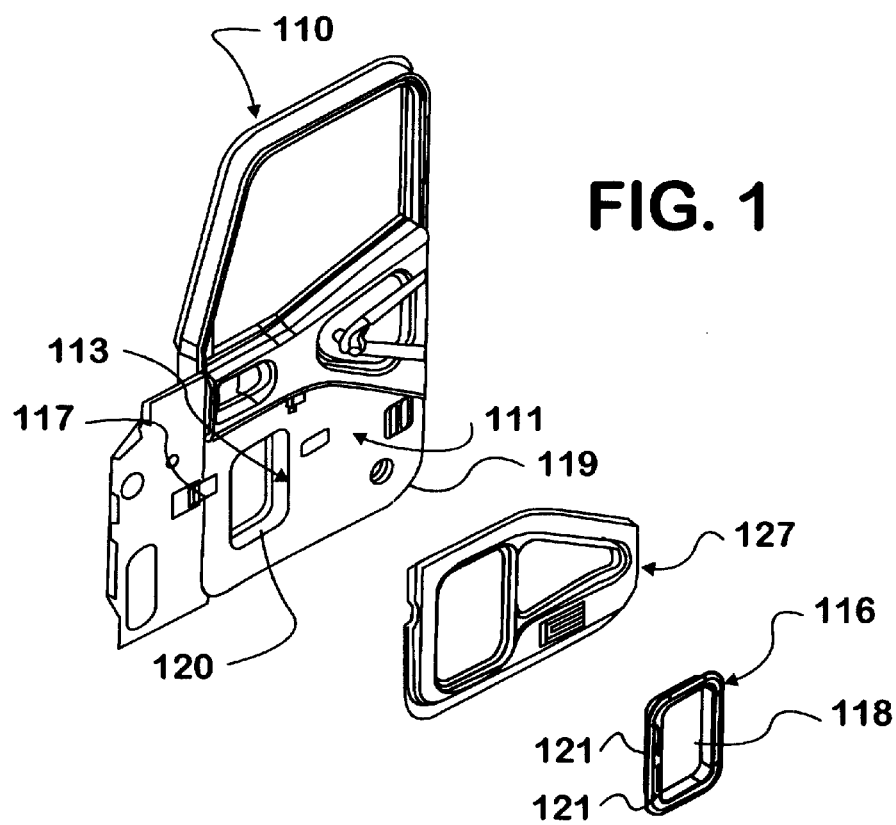
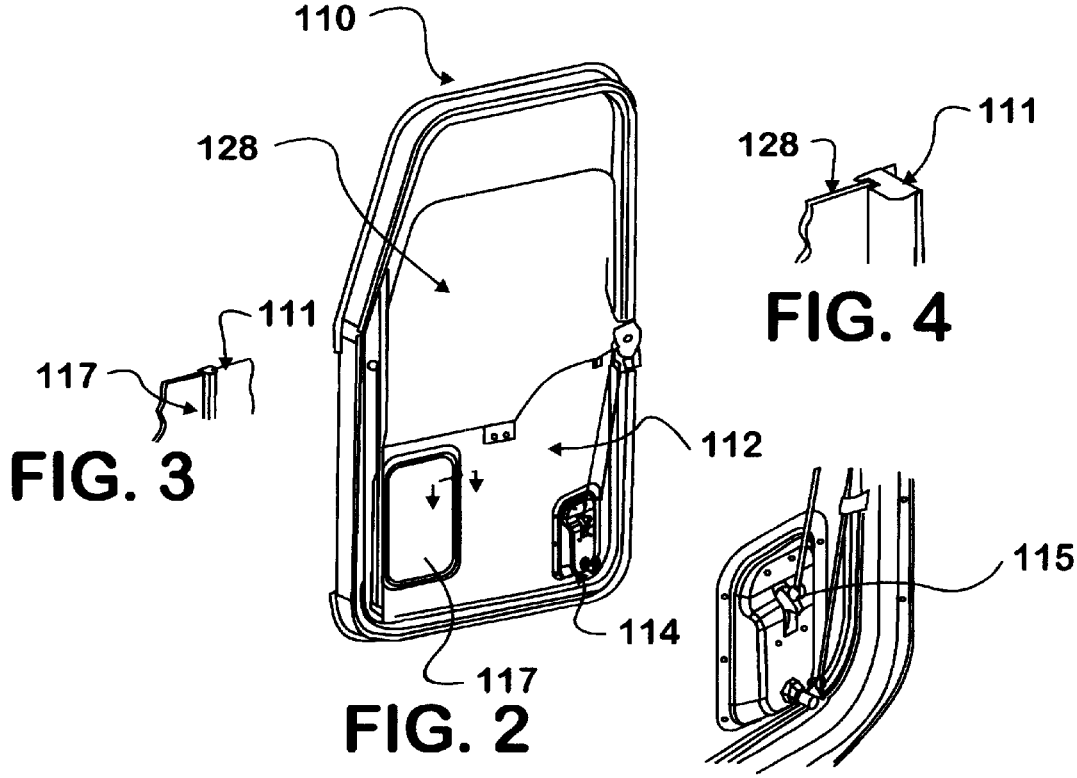

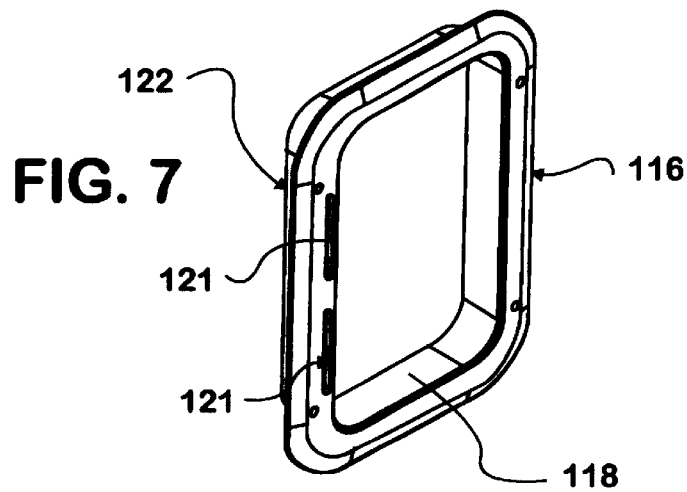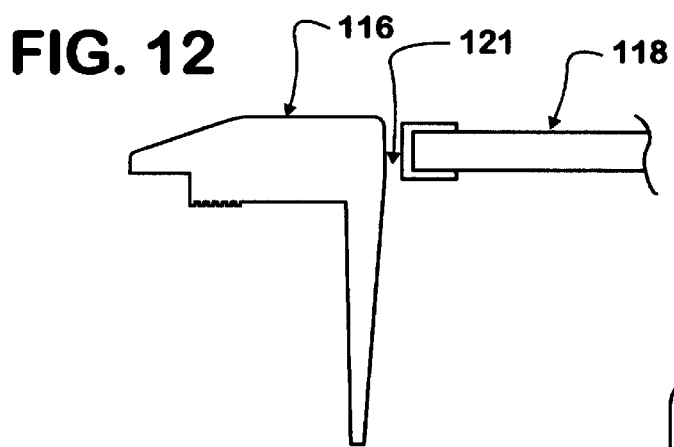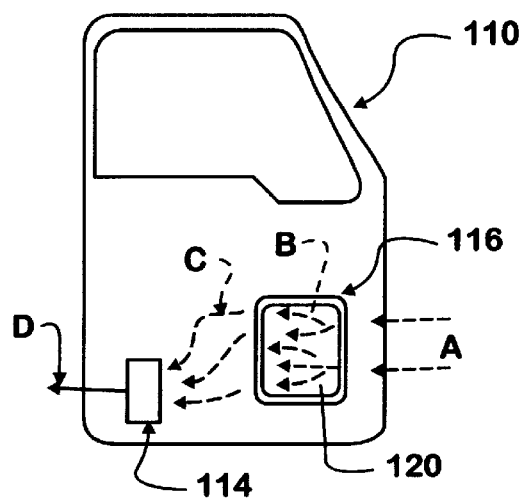

VEHICLE WINDOW VENTILATION SYSTEM

This is a non-provisional patent application claiming priority of provisional patent application serial No. 60/238,324, filed Oct. 5, 2000.

BACKGROUND

This invention relates to a vehicle window ventilation system and vehicle with the system installed for removing condensation from double windows in vehicle door panels. Some large vehicles such as heavy-duty highway tractor-trailer trucks include double windows within the doors. These are commonly located in the lower front corner of the passenger door to allow the driver to view traffic in the passenger side lane. The double windows have a tendency of fogging to the accumulation of moisture between the windows. Water vapor can make its way from the passenger compartment or the exterior of the cab, into the door cavity. This vapor will tend to condense on the inner pane of the outer view window. It can turn to frost in the winter. This invention alleviates the moisture between the windowpanes in such double pane windows in vehicle doors.

SUMMARY

An object of the invention is to provide a vehicle window ventilation system for a mobile vehicle with double pane windows within the door that allows for removal of moisture and condensation between the windows without the need for any external fan and allows for minimum reduction of visibility through the window due to moisture.

The vehicle window ventilation system of this invention satisfies the named objective. The system contains vertical slots in forward portions of the window or frame. Air due to vehicle movement passes in the slots to the cavity between the windowpanes. There is a passage for airflow from the cavity rearward to the door handle where there is spacing for outward passage of air. The forward location of the vertical slots allows for the flow of air across a wide area of the windows and hence a minimum reduction of visibility due to moisture in the cavity. The air passageway rearward through the cavity between the windows and then through the door to the rearward located door handle allows for a dispersion pattern of air that covers a large amount of the surface area of the double pane window. While an external fan could be used to enhance the removal of flow of air the forward location of the vertical slots and the rearward location of the inner door passageway to the door handle alleviates the necessity of having a fan. The vertical slots allow the direction of airflow over the windowpanes inner surfaces from the top to the bottom of the panes.

Additional effects, features and advantages will be apparent in the written description that follows.

BRIEF DESCRIPTION OF THE DRAWINGS

The novel features believed characteristic of the invention are set forth in the appended claims.

The invention itself however, as well as a preferred mode of use, further objects and advantages thereof, will best be understood by reference to the following detailed description of an illustrative embodiment when read in conjunction with the accompanying drawings, wherein:

FIG. 1 is a partially exploded perspective view of a vehicle door containing a window ventilation system made in accordance with this invention;

FIG. 2 is a perspective view of the outer portion of the door of FIG. 1;

FIG. 3 is a Section A—A cutaway from FIG. 2;

FIG. 4 is Section B—B cutaway from FIG. 2;

FIG. 5 is a blown up view of the circled Area C from FIG. 2;

FIG. 7 is a perspective view of the window of FIG. 6;

FIG. 12 is a Section C—C cutaway view from FIG. 6;

FIG. 14 is an airflow drawing of the door of FIG. 2.

DETAILED DESCRIPTION OF THE INVENTION

Figure 6:
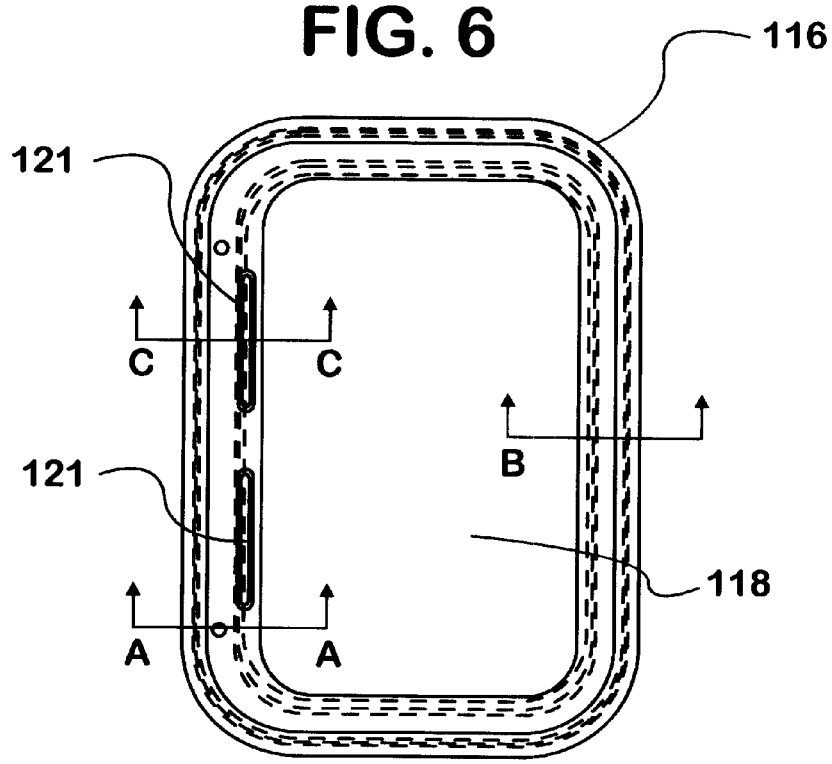
FIG. 6 is a front view of a window and frame for the system of FIG. 1.
Figure 9:
FIG. 9 is a side view of the window of FIG. 6.
Figure 8:
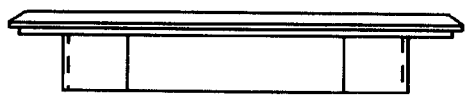
FIG. 8 is a top down view of the window of FIG. 6.
Figure 11:
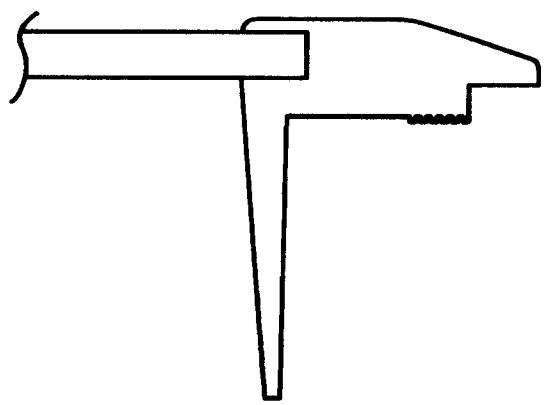
FIG. 11 is a Section B—B cutaway view from FIG. 6.
Figure 10:
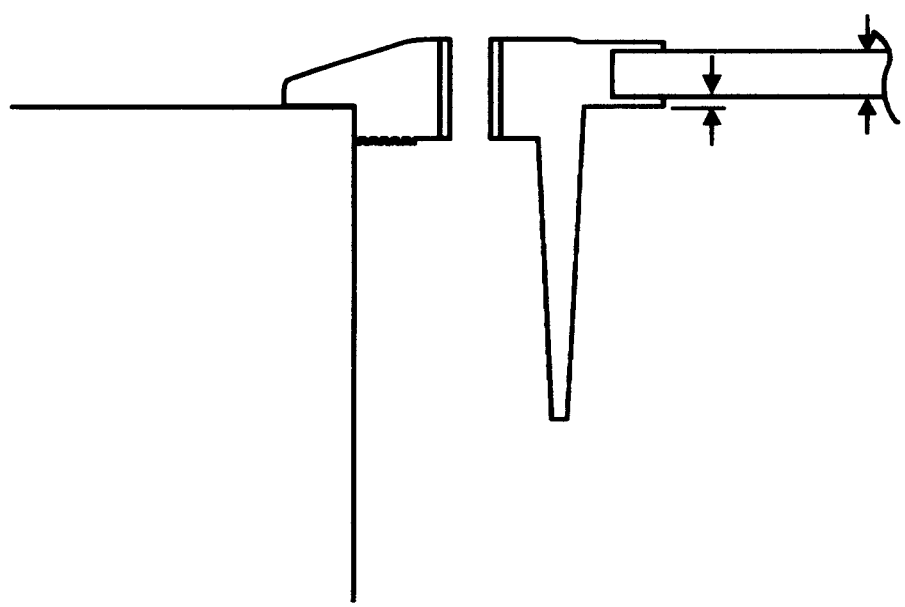
FIG. 10 is a Section A—A cutaway view from FIG. 6.
Figure 13:
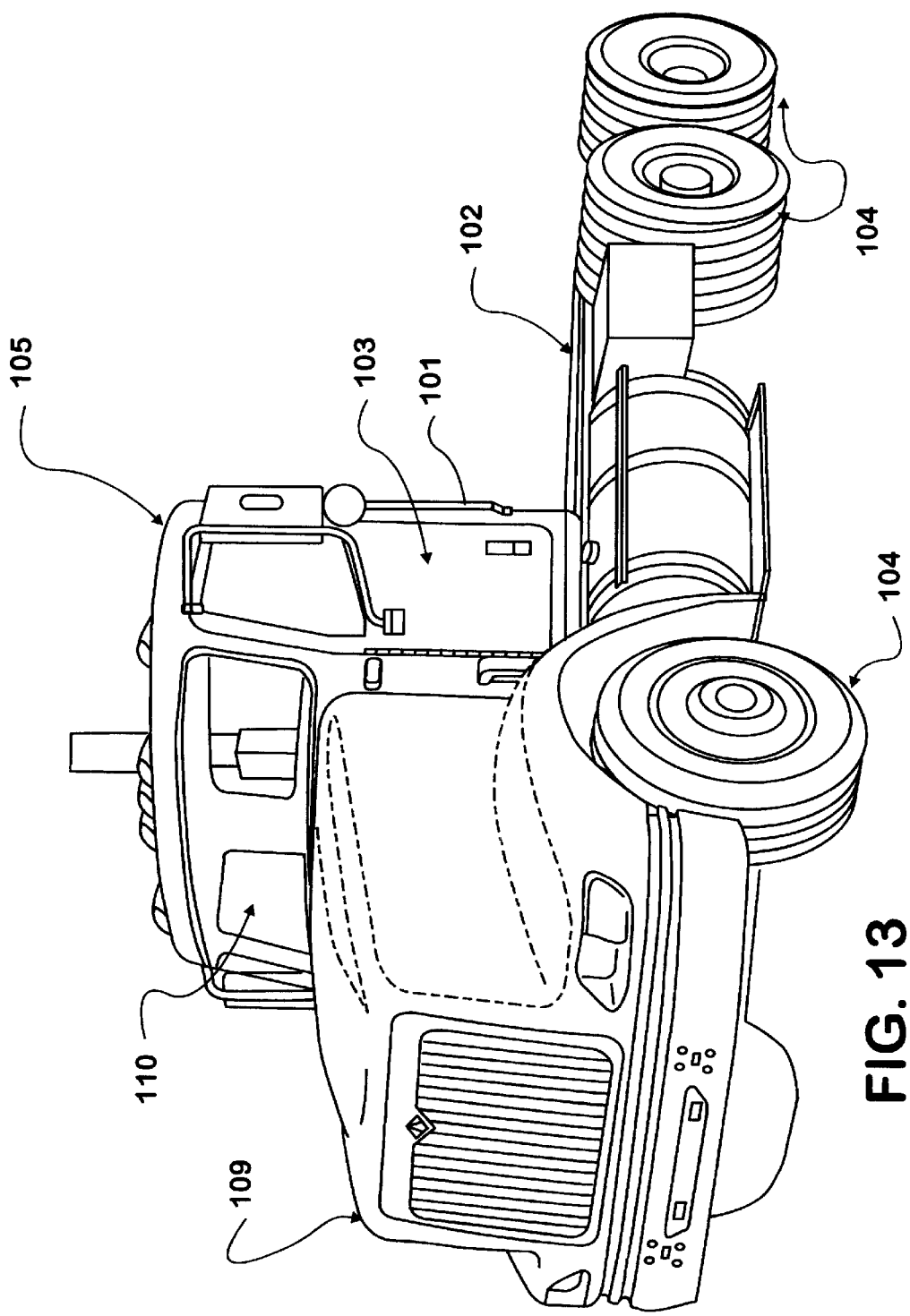
FIG. 13 is a vehicle containing the vehicle window ventilation system of FIG. 1.

The vehicle window ventilation system 119 of this invention may be incorporated into on a mobile vehicle 101. See FIGS. 1, 2, and 13. The vehicle 101 will have a chassis 102. The chassis 102 will have axles with wheels 104 engaged. The chassis 102 contains an engine and a drive train to propel the vehicle on the wheels 104. There is a cab 105 for a driver and passenger engaged to the chassis 102. The cab 105 will have a driver door 103 and a passenger door 110.

The passenger door 110 has an inner surface 111 and an outer surface 112 sandwiched together to form a door cavity 113. As shown in FIGS. 1 to 5, the outer surface 112 in combination with the inner door surface 112 define the retractable window 128. The passenger door 110 has a door handle 114 located rearward on the passenger door 110 relative to the vehicle front 109. The door handle 114 has an opening 115 to the door cavity 113. This door handle opening 115 allows passage of air and moisture from the door cavity 113 to the outside environment or atmosphere as well as air inward to the door cavity 113 from the environment. See FIGS. 2 and 5 for the door handle 114. There is a double window engaged to the passenger door 110. An outer pane 117 is engaged to the door inner surface 111. The double window has an inner pane 118 that may include an inner frame 116. The outer pane 117 is engaged to the outer surface 112 to form a window cavity 120 between the inner pane 118 and the outer pane 117. In one embodiment shown in FIG. 1, the inner surface 111 is engaged to the outer surface 112 to form the door cavity 113. A lower door trim panel 127 is engaged to the inner surface 111. The inner frame 116 with the inner pane 118 is engaged to the inner surface 111 through the lower door trim panel 127 in this embodiment.

Either the inner pane 118 or the inner frame 116 has at least one vertical slot 121 on a forward frame portion 122 relative to the vehicle 101 front. The frame 116 shown has two vertical slots 121 although one can be sufficient: The shape of the slot 121 can vary. The generally vertical nature can be important in achieving the proper airflow pattern across inner surfaces of the inner pane 118 and outer pane 117. The airflow pattern is shown in FIG. 14. FIGS. 6 to 12 show the inner frame 116 and inner pane 118. The vertical slot 121 allows free flow of air, shown as Air Flow A, from the cab 105 to the window cavity 120. The window cavity 120 is in free communication with the door cavity 113. As such there is a complete passageway for airflow from the window cavity 120 through the door cavity 113 to the door handle 114. Airflow across the outer surface 112 of the passenger door 110 creates a low-pressure area on the surface. The result is that air is drawn out of the opening 115 in the door handle 114 from the door cavity 113. This in turn causes an airflow A from the cab 105 interior through the vertical slot or slots 121 of the inner pane 118 or inner window frame 116 and then rearward across inner surfaces of said inner pane 118 and outer pane 117 from top to bottom of the panes, shown as Airflow B. Airflow C from the window cavity 120 through the door cavity 113, with Airflow D showing the passage of air through the opening 115 in the door handle 114 to the outside environment. The result of this airflow across the inner surfaces of the panes result in removal of any condensation on the windowpanes. The result is improved visibility through the double window comprised of inner pane 118 and outer pane 117.

This airflow pattern has been proven to defrost the window in sub-zero temperature testing. In one test, the outer window was defrosted in 27 minutes of normal airflow with an approximately 12 inch by 7 inch window pane and two vertical slots approximately 3 inches long and 0.1 inches wide.

The inner frame 116 may be an encapsulating material that surrounds the outer surface of the inner pane 118. Where the frame 116 is an encapsulating material, the slots 121 may conveniently be through the encapsulating material of the inner frame 116.

As described above, the vehicle window ventilation system 119 and the vehicle 101 with the system installed provide a number of advantages, some of which have been described above and others of which are inherent in the invention. Also modifications may be proposed to the vehicle window ventilation system 119 and the vehicle 101 with the system installed without departing from the teachings herein.

I claim:

1. A vehicle window ventilation system in combination with a door for a mobile vehicle, comprising:
    a vehicle door with an inner surface and an outer surface to form a door cavity;
    said door having a handle located rearward on said door relative to the vehicle front;
    said door handle having an opening to said door cavity;
    a double window located within said door;
    said double window having an inner pane and frame and an outer pane to form a window cavity;
    said inner pane and frame having at least one vertical slot on a forward portion relative to the vehicle front;
    said vertical slot allowing free flow of air from a cab interior to said window cavity; and
    a passageway from said window cavity through said door cavity to said door handle opening such that vehicle movement induces air flow rearward across inner surfaces of said inner pane and outer pane from top to bottom of said panes, said vehicle movement induced air flow continuing to said door cavity rearward to said door handle opening and outwards from said door.

2. A vehicle window ventilation system in combination with a door for a mobile vehicle, comprising:
    a vehicle door with an inner surface and an outer surface to form a door cavity;
    said door having a handle located rearward on said door relative to the vehicle front;
    said door handle having an opening to said door cavity;
    a double window located within said door; and
    said double window having an inner pane and frame and an outer pane to form a window cavity;
    said inner pane and frame having at least one opening allowing free flow of air from a vehicle cab interior to said window cavity to said door cavity and out through said door handle opening, said air flow induced from vehicle movement and said air flow passing rearward across inner pane surfaces from top to bottom of said panes.

3. The ventilation system and door combination of claim 2, wherein:
    said opening is a vertical slot.

4. The ventilation system and door combination of claim 3, wherein:
    said vertical slot is located in a encapsulating material that surrounds said inner pane.

5. A mobile vehicle, comprising:
    a chassis with wheels engaged;
    a driver and passenger cab engaged to said chassis;
    said cab having a driver door and a passenger door;
    said passenger door having an inner surface and an outer surface to form a door cavity;
    said passenger door having a handle located rearward on said passenger door relative to the vehicle front;
    said door handle having an opening to said door cavity;
    a double window located within said door;
    said double window having an inner pane and frame and an outer pane to form a window cavity;
    said inner pane and frame having at least one vertical slot on a forward portion relative to the vehicle front; and
    said vertical slot allowing free flow of air from a cab interior to said window cavity; and
    a passageway from said window cavity through said door cavity to said door handle opening such that vehicle movement induces air flow rearward across inner surfaces of said inner pane and outer pane from top to bottom of said panes, said vehicle movement induced air flow continuing to said door cavity rearward to said door handle opening and outwards from said passenger door.

6. A mobile vehicle, comprising:
    a chassis with wheels engaged;
    a driver and passenger cab engaged to said chassis;
    said cab having a driver door and a passenger door;
    said passenger door having an inner surface and an outer surface to form a door cavity;
    said passenger door having a handle located rearward on said door relative to the vehicle front;
    said door handle having an opening to said door cavity;
    a double window located within said door;
    said double window having an inner pane and frame and an outer pane to form a window cavity; and
    said inner pane and frame having at least one opening allowing free flow of air from a vehicle cab interior to said window cavity to said door cavity and out through said door handle opening, said air flow induced from vehicle movement and said air flow passing rearward across pane inner surfaces from top to bottom of said panes.

7. The vehicle of claim 6, wherein:
    said opening is a vertical slot.

8. The vehicle of claim 7, wherein:
    said vertical slot is located in a encapsulating material that surrounds said outer pane.

9. The vehicle of claim 7 wherein:
    wherein there is a second vertical slot in line with said first vertical slot and positioned such that said two vertical slots provide said airflow distribution across said pane inner surfaces from top to bottom of said panes.

* * * * *